(12) United States Patent
Potocki

(10) Patent No.: US 9,527,120 B2
(45) Date of Patent: Dec. 27, 2016

(54) TRANSVERSE STRUT AND METHOD OF FORMING A TRANSVERSE STRUT

(71) Applicant: John Richard Potocki, Armada, MI (US)

(72) Inventor: John Richard Potocki, Armada, MI (US)

(73) Assignee: Magna International Inc., Aurora, Ontario (CA)

( * ) Notice: Subject to any disclaimer, the term of this patent is extended or adjusted under 35 U.S.C. 154(b) by 0 days.

(21) Appl. No.: 14/375,217

(22) PCT Filed: Feb. 1, 2013

(86) PCT No.: PCT/US2013/024368
§ 371 (c)(1),
(2) Date: Jul. 29, 2014

(87) PCT Pub. No.: WO2013/116666
PCT Pub. Date: Aug. 8, 2013

(65) Prior Publication Data
US 2014/0373589 A1    Dec. 25, 2014

Related U.S. Application Data

(60) Provisional application No. 61/593,377, filed on Feb. 1, 2012.

(51) Int. Cl.
*B21B 1/095* (2006.01)
*B21D 5/08* (2006.01)
(Continued)

(52) U.S. Cl.
CPC ............. *B21B 1/095* (2013.01); *B21D 5/08* (2013.01); *B21D 53/88* (2013.01); *B60G 21/051* (2013.01);
(Continued)

(58) Field of Classification Search
CPC .............. B60G 21/051; B60G 2206/20; B60G 2206/202; B60G 2206/8103; B60G 7/001; B60G 2206/012; B60G 2206/8109; Y10T 29/49622; B60B 2310/211; B21D 5/08; B21D 53/88; B21B 1/088
See application file for complete search history.

(56) References Cited

U.S. PATENT DOCUMENTS

| 6,523,841 B2* | 2/2003 | Glaser | B60B 35/006 280/124.106 |
| 8,136,871 B2* | 3/2012 | Yoshida | B21D 7/08 293/122 |

(Continued)

FOREIGN PATENT DOCUMENTS

JP    08-197108 A    8/1996

*Primary Examiner* — Peter DungBa Vo
*Assistant Examiner* — John S Lowe
(74) *Attorney, Agent, or Firm* — Dickinson Wright PLLC

(57) ABSTRACT

A roll forming assembly for forming a transverse strut from a tube is provided. The roll forming assembly includes a heater, such as an induction heater, for heating a tube to a predetermined annealing temperature. Next, the tube is fed to a roll former, which includes a plurality of forming wheels to shape the tube into a transverse strut. Servo motors are operably coupled to the forming wheels for adjusting the positions of the forming wheels in a radial direction during the roll forming process to give the transverse strut a variable profile along its length. After the roll forming process is completed, the transverse strut is quenched so that its base material is given a predetermined microstructure.

15 Claims, 4 Drawing Sheets

(51) Int. Cl.
 *B21D 53/88* (2006.01)
 *B60G 21/05* (2006.01)
 *B60G 21/055* (2006.01)

(52) U.S. Cl.
 CPC ... *B60G 2202/136* (2013.01); *B60G 2206/012* (2013.01); *B60G 2206/20* (2013.01); *B60G 2206/202* (2013.01); *B60G 2206/8109* (2013.01)

(56) References Cited

U.S. PATENT DOCUMENTS

| | | | |
|---|---|---|---|
| 8,490,990 B2* | 7/2013 | Lepre | B21C 1/24 267/188 |
| 8,833,127 B2* | 9/2014 | Tomizawa | B21C 37/155 72/128 |
| 2008/0150349 A1* | 6/2008 | Riffier | B60G 21/051 301/124.1 |
| 2010/0078254 A1 | 4/2010 | Rolfe et al. | |
| 2010/0084892 A1 | 4/2010 | Yoshida et al. | |
| 2011/0115183 A1* | 5/2011 | Alesso | B60G 21/051 280/124.106 |

* cited by examiner

TRANSVERSE STRUT AND METHOD OF FORMING A TRANSVERSE STRUT

CROSS-REFERENCE TO RELATED APPLICATIONS

This U.S. National Stage Patent Application claims the benefit of International Application serial number PCT/US2013/024368 filed Feb. 1, 2013, entitled "Transverse Strut And Method Of Forming A Transverse Strut" which claims priority to U.S. provisional application Ser. No. 61/593,377 filed Feb. 1, 2012, the entire disclosures of the applications being considered part of the disclosure of this application, and hereby incorporated by reference.

BACKGROUND OF THE INVENTION

1. Field of the Invention

The present invention relates generally to vehicle suspensions and, more particularly, to twist beam rear axles of vehicle suspensions.

2. Description of the Prior Art

Twist beam axle suspensions for motor vehicles typically include a transverse strut and a pair of control arms, each of which is operably coupled with one of the vehicle's wheels. In operation, the transverse strut provides roll stiffness to the vehicle's suspension by twisting as the two control arms move vertically relative to one another, such as while the vehicle is turning under speed. This has the effect of reducing roll of the vehicle body during cornering.

Transverse struts are typically shaped to provide the vehicle with a particular roll stiffness. One known way of shaping a transverse strut involves squashing a tube, either while cold or hot, with a special tool. However, this and other known ways to shape a transverse strut may be costly or may not be capable of shaping, traverse struts to very tight tolerances. Additionally, a different squashing tool may be required to form transverse struts having different shapes, sizes, or dimensions.

SUMMARY OF THE INVENTION

One aspect of the present invention provides for a roll tube forming assembly for forming a tube into a transverse strut. The forming assembly includes a heater for heating the tube to a predetermined temperature. The forming assembly also includes a roll former having a plurality of forming wheels for deforming the tube and an actuator operably coupled to at least one of the forming wheels. The actuator is configured to move the associated of the forming wheels in a radial direction to deform the tube into a transverse strut having a variable cross-section. The roll forming assembly is advantageous because, through simple adjustments in the movements of the actuators, it can be used to form transverse struts having different lengths, shapes, or dimensions. This is less costly and more efficient at forming different transverse struts than other known processes. Additionally, the roll forming assembly may form transverse struts having much tighter tolerances as compared to other known forming assemblies.

According to another aspect of the present invention, the roll forming assembly further includes a quenching bath for cooling the transverse strut after the roll forming. This, in combination with the heater for heating the tube before the roll-forming, allows for the transverse strut to be heat treated during the forming process. Thus, without any additional manufacturing structure or steps, the roll forming assembly can produce both a shaped and heat-treated transverse strut with little additional cost.

According to yet another aspect of the present invention, the actuator is operably coupled with the forming wheel or wheels through a ball screw connection. This provides for very precise control of the positioning of the forming wheel or wheels.

According to another aspect of the present invention, a method of forming a transverse strut from a tube is provided. The method includes the step of roll forming the tube with a plurality of forming wheels to shape the tube. During the roll forming step, the method includes adjusting the position of at least one of the forming wheels in a radial direction with an actuator to change the cross-sectional profile of the tube along its length to give the transverse strut a variable profile along its length.

According to yet another aspect of the present invention, the method includes the steps of heating the tube to a predetermined annealing temperature before the step of roll forming the tube and quenching the tube after the roll forming of the tube into the transverse strut. The heating of the tube before the roll forming improves the roll forming process, and the quenching heat treats the transverse strut very efficiently for very little or no additional costs. This is more efficient than other known processes for forming transverse struts, where the transverse strut is heated and quenched after the shaping process is complete.

BRIEF DESCRIPTION OF THE DRAWINGS

These and other features and advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
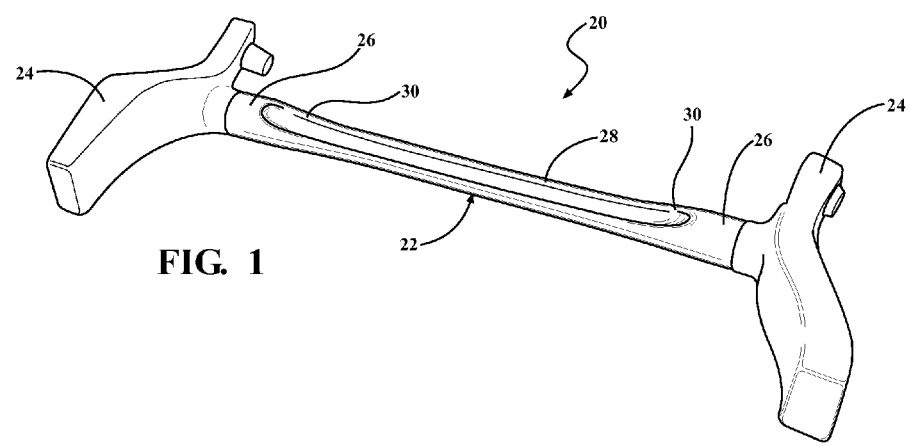
FIG. 1 is a perspective and elevation view of an exemplary twist beam axle assembly.

Referring to the Figures, wherein like numerals indicate corresponding parts throughout the several views, an exemplary twist beam axle assembly 20 for use in an automobile and formed with a hot roll forming process is generally shown in FIG. 1. The exemplary twist beam axle assembly 20 has a transverse strut 22 which extends along an axis A and a pair of longitudinally spaced control arms 24 which are attached to opposite ends of the traverse strut 22. The control arms 24 are preferably welded to the opposite ends of the transverse strut 22 and could have any desirable size or shape depending upon the type of suspension system in the vehicle for which the twist beam axle assembly 20 is designed.

Figure 2:
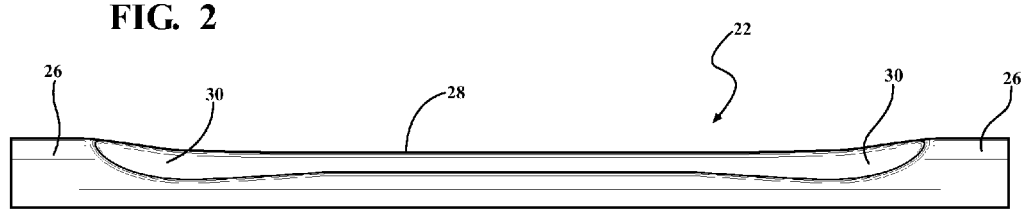
FIG. 2 is a perspective and elevation view of a transverse strut of the twist beam axle assembly of FIG. 1.

Referring now to FIG. 2, the exemplary transverse strut 22 has a pair of end sections 26, each of which has a substantially cylindrical profile. The exemplary transverse strut 22 also has a middle section 28 with an axially extending pocket which gives the middle section 28 a generally U-shaped profile. In between the middle section 28 and the sections 26, the exemplary transverse strut 22 includes a pair of transition sections 30 which transition between the cylindrical and U-shaped profiles of the end sections 26 and the middle section 28 respectively. It should be appreciated that the end sections 26 could alternately have a non-cylindrical shape, and the middle section 28 could have a range of other non-circular profiles including, for example, a C-shape, a V-shape, or an Ω-shape. It should be appreciated that the shape, dimensions and material of the middle and transition sections 28, 30 of the transverse strut 22 influence the performance characteristics, such as the roll stiffness, of the vehicle's suspension.

Figure 3:
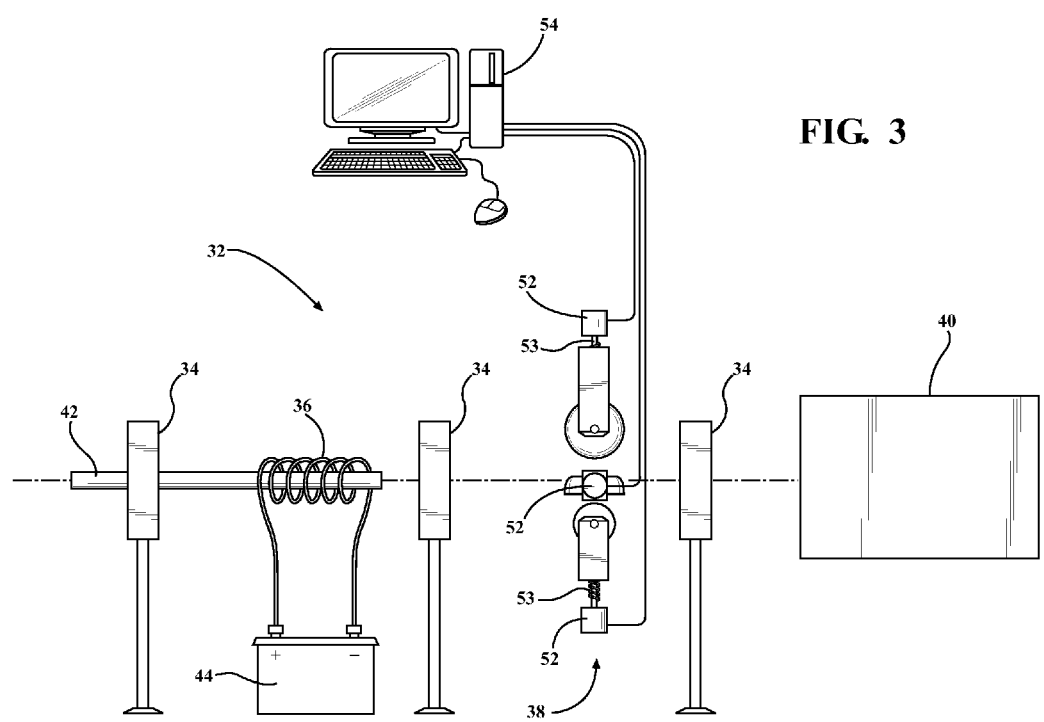
FIG. 3 is a schematic diagram of an exemplary hot tube roll forming assembly.
Figures 5, 6:
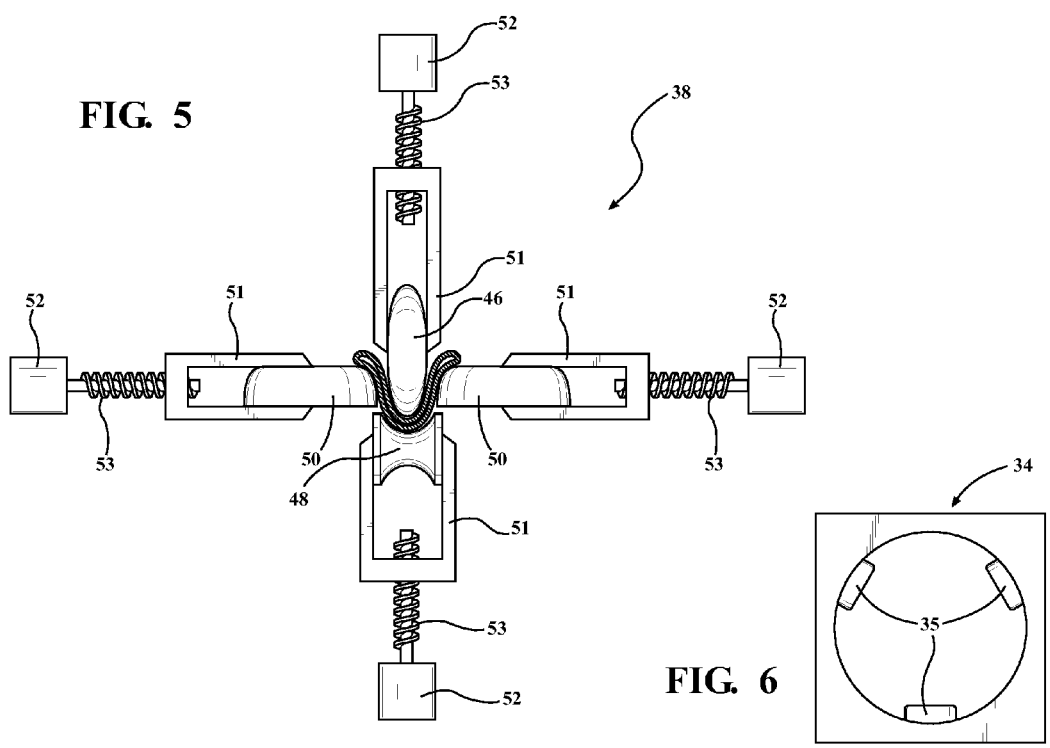
FIG. 5 is a front view of the roll former of FIG. 4 and with the forming wheels shaping the tube into a transverse strut.
FIG. 6 is a front view of an exemplary tube mover for guiding a tube through the hot tube roll forming assembly of FIG. 3.

Referring now to FIG. 3, a hot tube roll forming assembly 32 for shaping stock tubes 42 into transverse struts (such as the transverse strut 22 shown in FIG. 2 and discussed above) is generally shown. The exemplary hot roll forming assembly 32 includes a plurality of tube drivers 34, a heater 36, a roll former 38, and a quenching bath 40. The exemplary transverse strut 22 starts as a stock tube 42 having a diameter which is similar to the diameter of the cylindrical end sections 26 of the final transverse strut 22 to be produced. The tube 42 is preferably of one or more metals, such as various grades or alloys of steel, aluminum, iron, magnesium, etc. However, it should be appreciated that the tube 34 could be of any desirable type of formable material. During the roll forming process, the tube 42 is fed through the hot tube roll forming assembly 32 by the tube driver 34 or tube drivers 34. In the exemplary embodiment, the hot tube roll forming assembly 32 includes a plurality of tube drivers 34, which are positioned between the other components of the hot tube roll forming assembly 32. However, the hot roll forming assembly could include any desirable number of tube drivers 34. As shown in FIG. 6, the exemplary tube drivers 34 include a plurality of driven rollers 35 for urging the tube 42 in the axial direction. However, each tube driver 34 could be any desirable type of machine or robot for controllably guiding tubes 42 through the hot roll forming assembly 32.

Referring back to FIG. 3, during operation of the hot tube roll forming assembly 32, the tube 42 is fed by the tube driver 34 through or adjacent to the heater 36 which heats the tube 42 to a predetermined annealing temperature for easier shaping and for preventing cracks during the shaping process, which is discussed in further detail below. In the exemplary embodiment, the heater 36 is an induction heater 36 which is electrically connected to a power source 44. The power source 44 is illustrated in the exemplary embodiment as being a battery. However, it should be appreciated that any desirable type of power source may be employed. When activated, the induction heater 36 heats the tube 42 through electromagnetic radiation, which has been found to be particularly efficient at heating metals and certain other materials to precise temperatures. However, it should be appreciated that any desirable type of heater or combination of heaters could be employed in the forming assembly 32 to heat the tube 42 to the predetermined annealing temperature.

Figure 4:
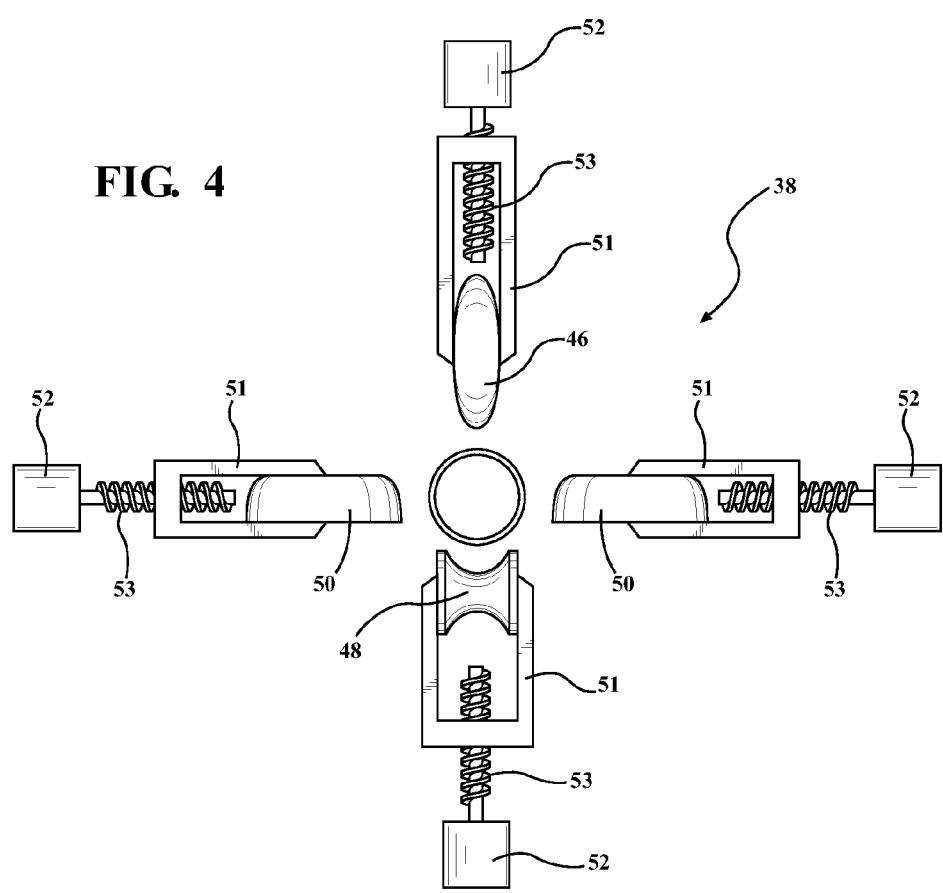
FIG. 4 is a front view of an exemplary roll former including a plurality of forming wheels disengaged from a tube.

After being heated to the predetermined annealing temperature, one of the tube drivers 34 feeds the tube 42 to the roll former 38. As best shown in FIG. 4, the exemplary roll former 38 includes a plurality of forming wheels 46, 48, 50 arranged in a pattern. More precisely, the exemplary roll former 38 has an upper forming wheel 46, a lower forming wheel 48 and a pair of side forming wheels 50. Each of the forming wheels 46, 48, 50 is straddled by a fork-shaped member 51 which is operably coupled to a servo motor 52 via a ball screw 53 type of connection including a threaded rod. However, it should be appreciated that the forming wheels 46, 48, 50 could be coupled with the servo motors 52 through any desirable type of connection. The servo motors 52 are in electrical communication with a controller 54 which is configured to precisely adjust the positions of the forming wheels 46, 48, 50 relative to one another and relative to the tube 42 being fed through the hot tube roll forming assembly 32. In the exemplary embodiment, the controller 54 is shown as a desktop computer. However, it should be appreciated that any desirable type of controller could alternately be employed. In operation, the controller 54 activates the servo motors 52 to adjust the positions of the forming wheels 46, 48, 50 and urge them against the tube 42. Electric servo motors 52 are preferred for controlling the positions of the forming wheels 46, 48, 50 because they are easily controlled and allow for quick and precise movements. However, it should be appreciated that any desirable type of actuators could be employed including, for example, hydraulic actuators or pneumatic actuators.

Referring now to FIG. 4, in the exemplary embodiment, when the tube 42 is first inserted into the roll former 38, the forming wheels 46, 48, 50 are spaced radially from the tube 42. The tube 42 is then fed a predetermined axial distance corresponding to the length of the cylindrical end sections 26 of the transverse strut 22 to be formed. Next, as the tube 42 continues to be fed in the axial direction, the controller 54 (shown in FIG. 3) operates the servo motors 52 to move each of the forming wheels 46, 48, 50 through a predetermined pattern with the forming wheels 46, 48, 50 engaging with the tube 42 to plastically deform the material of the tube 42 and shape it into a transverse strut 22. For example, as shown FIG. 5, the forming wheels 46, 48, 50 have moved to engage the transverse strut 22, and the lower forming wheel 48 has been moved upwardly towards the upper forming wheel 46 to reduce the distance between the upper and lower forming wheels 46, 48 and give the middle section 28 of the transverse strut 22 the U-shaped profile described above. Controlled movements of the forming wheels 46, 48, 50 allow the roll former 38 to form both the transition sections 30 and the middle section 28 to very precise tolerances. For example, the exemplary roll former 38 has been found to be able to form transverse struts 22 to dimensions accurate to 0.1 mm. Additionally, the controller 54 may be programmed to operate the servo motors 52 to move the forming wheels 46, 48, 50 through different patterns thereby allowing for the formation of differently sized and shaped transverse struts 22 on the same hot tube roll forming assembly 32 with little or no adjustments to the other components of the hot tube roll forming assembly 32. In other words, by reprogramming the controller 54, the hot tube roll forming assembly 32 may be used to form transverse struts 22 which are optimized for the suspensions of different types of vehicles or to form transverse struts 22 which give the same vehicle suspension different performance characteristics. It should be appreciated that the hot tube roll forming assembly 32 could include more than one set of forming wheels 46, 48, 50, if desired.

Referring back to FIG. 3, the exemplary assembly additionally includes a quenching bath 40 for quenching the heated transverse strut 22 after the roll forming process is completed. The entire transverse strut 22 could be simultaneously quenched, or only specific portions of the transverse strut 22 could be quenched to give the transverse strut 22 variable material characteristics. The fluid in the quenching bath 40 is preferably water; however, it should be appreciated that any desirable type of fluid could be employed. Quenching of the transverse strut 22 allows for the properties of the material to be controlled and also provides oxidation resistance to the transverse strut 22. As such, in addition to shaping the tube 42 into a transverse strut 22, the hot tube roll forming assembly 32 also heat treats the material of the transverse strut 22 with little additional cost. This is beneficial because a separate heat treating process is not needed.

Referring once again to FIGS. 4 and 5, each of the forming wheels 46, 48, 50 of the roll former 38 has a specific profile for forming its respective surface of the transverse strut 22. For example, in the exemplary embodiment, the upper forming wheel 46 has a generally concave shape, the lower forming wheel 48 has a generally convex shape and each of the side forming wheels 50 has a frustoconical shape. However, it should be appreciated that the forming wheels 46, 48, 50 could take a wide range of other shapes to form differently shaped transverse struts 22. The forming wheels 46, 48, 50 could also be removable and interchangeable for forming differently shaped transverse struts. Additionally, although the exemplary roll former 38 has four wheels 46, 48, 50, it should be appreciated that the roll former 38 could include any desirable number of forming wheels.

Another aspect of the present invention is a method of forming a transverse strut 22 for a twist beam axle assembly 20 from a tube 42. An exemplary embodiment of the method includes the step of roll forming the tube 42 with a plurality of forming wheels 46, 48, 50 to shape the tube 42. During the roll forming step, the method continues with adjusting the position of at least one of the forming wheels 46, 48, 50 in a radial direction to change the cross-sectional profile of the tube 42 to form a transverse strut 22 having a variable profile along its length. Preferably, at least one of the forming wheels 46, 48, 50 is adjusted from a first position spaced from another of the forming wheels 46, 48, 50 by a predetermined distance to a second position spaced from the other of the forming wheels 46, 48, 50 by a lesser distance to form a pocket in the transverse strut 22. The adjustments of the forming wheel or forming wheels 46, 48, 50 could be through, for example, a ball screw connection between the actuator(s) and the forming wheel(s) 46, 48, 50. The forming wheels 46, 48, 50 may have similar or different shapes and, preferably, at least one of the forming wheels is non-cylindrical. Preferably, the roll forming step forms a transverse strut 22 having a pair of end sections 26 with generally cylindrical shapes and a middle section 28 disposed between the end sections 26 with a pocket.

The method may additionally include the step of heating the tube 42 before the step of roll forming the tube 42 and may also include the step of quenching at least a portion of the transverse strut 22 to give the material of the transverse strut 22 a desired microstructure. The heating of the tube 42 could be with, for example, an induction heater 36.

Obviously, many modifications and variations of the present invention are possible in light of the above teachings and may be practiced otherwise than as specifically described while within the scope of the appended claims.

What is claimed is:

1. A roll forming assembly for forming a tube into a transverse strut, comprising:

a heater for heating the tube to a predetermined temperature;

a roll former including a plurality of forming wheels for deforming the tube, at least one of said forming wheels having a non-complementary shape to the tube for changing a cross-sectional shape of the tube along at least a portion of the length of the tube, and said plurality of forming wheels including two pairs of forming wheels with said forming wheels in each pair opposing one another;

an actuator operably coupled to at least one of said forming wheels of said roll former and configured to move the associated of said forming wheels in a radial direction to deform the tube into a transverse strut having a variable cross-sectional shape along the length of the transverse strut; and one of said forming wheels in at least one of said pairs having a convex rolling surface and the other of said forming wheels in the respective pair having a concave rolling surface such that operation of said actuator results in a portion of the transverse strut having a double walled and U-shaped cross-sectional shape.

2. The roll forming assembly as set forth in claim 1 wherein at least one of said forming wheels is non-cylindrical.

3. The roll forming assembly as set forth in claim 1 further including a quenching bath for cooling the transverse strut after being shaped by said roll former.

4. The roll forming assembly as set forth in claim 1 wherein said heater is an induction heater.

5. The roll forming assembly as set forth in claim 1 wherein said plurality of forming wheels of roll former includes a top forming wheel, a bottom forming wheel, and a pair of side forming wheels.

6. The roll forming assembly as set forth in claim 1 wherein said actuator is operably coupled with said at least one forming wheel via at least one ball screw.

7. The roll forming assembly as set forth in claim 1 further including a controller configured to control said actuator to form transverse struts having different configurations.

8. A method of forming a transverse strut from a tube, comprising the steps of:

roll forming the tube with two pairs of opposing forming wheels to shape the tube, wherein at least one of the forming wheels has a non-complementary shape to the tube, and wherein one of the forming wheels in at least one of the pairs has a convex rolling surface and the other of the forming wheels in the respective pair has a concave rolling surface; and adjusting the position of at least one of the forming wheels in a radial direction with an actuator during the roll forming of the tube to change the cross-sectional shape of the tube along a length of the tube to give the transverse strut a variable profile along the length and wherein the concave and convex rolling surfaces of one of the pairs of forming wheels deforms a portion of the transverse strut into a double walled and U-shaped cross-sectional shape.

9. The method of forming a transverse strut as set forth in claim 8 further including the step of heating the tube to a predetermined temperature before the step of roll forming the tube.

10. The method of forming a transverse strut as set forth in claim 9 further including the step of quenching the transverse strut after the step of roll forming the tube.

11. The method of forming a transverse strut as set forth in claim 8 wherein the adjusting step is further defined as adjusting the position of at least one roll forming wheel to from a first position spaced from another of the forming wheels by a predetermined distance to a second position being spaced from the other of the forming wheels by a lesser distance to form a pocket in the transverse strut.

12. The method of forming a transverse strut as set forth in claim 8 wherein the actuator adjusts the position of at least one of the forming wheels via a ball screw connection.

13. The method of forming a transverse strut as set forth in claim 12 further including the step of heating the tube with an induction heater.

14. The method of forming a transverse strut as set forth in claim 8 wherein at least one of the forming wheels has a non-cylindrical shape.

15. The method of forming a transverse strut as set forth in claim 8 wherein the roll forming step forms a transverse strut having a pair of end sections having generally cylindrical shapes and a pocket disposed between said end sections.

* * * * *